(12) United States Patent
Lewin et al.

(10) Patent No.: US 12,721,352 B2
(45) Date of Patent: Sep. 1, 2026

(54) DEVICE AND METHOD FOR FILLING AND/OR PORTIONING FOOD MASS ON A CARRIER

(71) Applicant: VEMAG Maschinenbau GmbH, Verden (DE)

(72) Inventors: Alexander Lewin, Verden (DE); Mitja Wagner, Dorverden (DE); Jens Frese, Thedinghausen (DE); Steffan Meinke, Verden (DE)

(73) Assignee: VEMAG Maschinenbau GmbH, Verden (DE)

( * ) Notice: Subject to any disclaimer, the term of this patent is extended or adjusted under 35 U.S.C. 154(b) by 2 days.

(21) Appl. No.: 18/891,304

(22) Filed: Sep. 20, 2024

(65) Prior Publication Data

US 2025/0100732 A1 Mar. 27, 2025

(30) Foreign Application Priority Data

Sep. 21, 2023 (DE) ........................ 102023125663.7

(51) Int. Cl.
*A21C 9/08* (2006.01)
*A23P 20/25* (2016.01)
(Continued)

(52) U.S. Cl.
CPC .............. *A21C 9/083* (2013.01); *A23P 20/25* (2016.08); *A23P 30/00* (2016.08); *B65B 25/065* (2013.01); *B65B 25/068* (2013.01); *B65G 54/02* (2013.01)

(58) Field of Classification Search
CPC ........... A21C 9/08; A21C 9/081; A21C 9/083; A23P 20/25; A23P 30/00; B65B 25/065; B65B 25/068; B65G 54/02
See application file for complete search history.

(56) References Cited

U.S. PATENT DOCUMENTS 7,284,477 B2 * 10/2007 Hansen .................. A23B 2/792 99/534
10,512,274 B2 * 12/2019 Mach ................. A22C 11/0263
(Continued)

FOREIGN PATENT DOCUMENTS

DE 102014116232 B4 7/2023
WO 2022184517 A1 9/2022

OTHER PUBLICATIONS

German Patent Office, Action issued in DE 10 2023 125 663.7, dated Apr. 29, 2024 (6 pages).
(Continued)

*Primary Examiner* — Nicolas A Arnett
(74) *Attorney, Agent, or Firm* — Wood Herron & Evans LLP

(57) ABSTRACT

An apparatus is provided for filling and/or portioning food mass on a carrier. The apparatus includes a machine frame, a carrier movably arranged on the frame, for receiving dispensed food mass, and a drive means for moving the carrier. In the apparatus, a mechanical separator is provided for mechanically separating the carrier and the drive means, the carrier is arranged above the separator, the drive means is arranged at least partly below the separator, and the carrier and the drive means are coupled with the aid of magnetic and/or electromagnetic means in such a way that the carrier can be moved by the drive means using magnetic or electromagnetic force.

13 Claims, 10 Drawing Sheets

(51) Int. Cl.
*A23P 30/00* (2016.01)
*B65B 25/06* (2006.01)
*B65G 54/02* (2006.01)

(56) References Cited

U.S. PATENT DOCUMENTS

| | | | | |
|---|---|---|---|---|
| 10,729,281 | B2 * | 8/2020 | Knuepfel | B25J 11/00 |
| 12,103,784 | B2 * | 10/2024 | Ragan | B65G 13/02 |
| 12,290,916 | B2 * | 5/2025 | Wipf | B25J 15/0061 |
| 12,384,633 | B2 * | 8/2025 | Neubauer | B65B 35/36 |
| 12,397,953 | B2 * | 8/2025 | Brunnquell | B26D 7/32 |
| 12,419,315 | B2 * | 9/2025 | Foltz | A22C 17/0093 |
| 2004/0221746 | A1 * | 11/2004 | Hansen | A22C 9/001 99/532 |
| 2020/0113372 | A1 * | 4/2020 | Knuepfel | A47J 31/42 |
| 2024/0051695 | A1 * | 2/2024 | Mondini | B65B 5/04 |
| 2024/0199257 | A1 * | 6/2024 | Brunnquell | B65B 25/065 |
| 2024/0308780 | A1 * | 9/2024 | Bialy | B65G 35/06 |

OTHER PUBLICATIONS

European Patent Office, Extended Search Report issued in EP 24201709.3-1002, dated Jan. 21, 2025 with English Translation (20 pages).

* cited by examiner

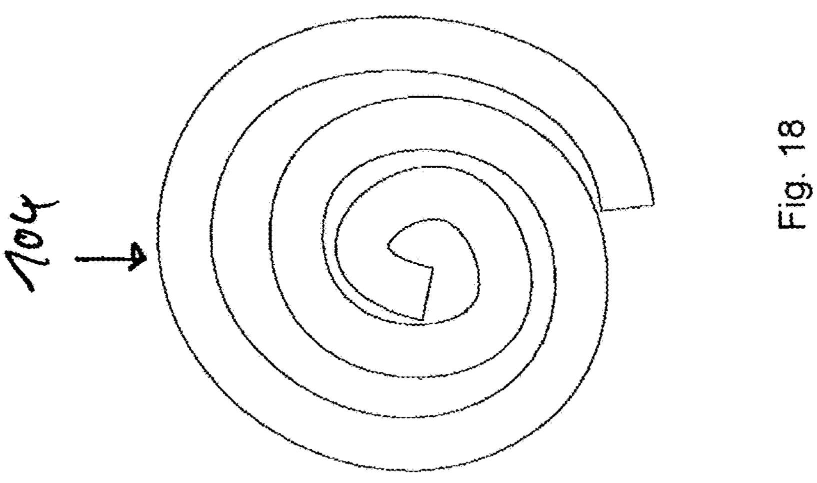
Fig. 18
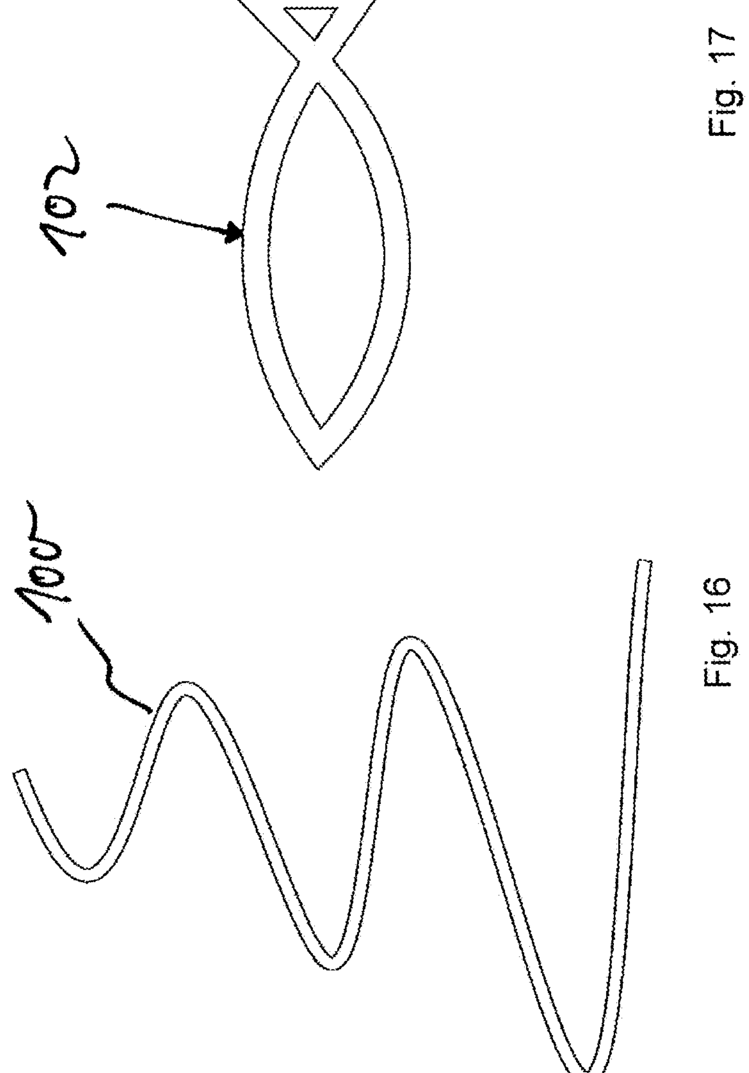
Fig. 17
Fig. 16

DEVICE AND METHOD FOR FILLING AND/OR PORTIONING FOOD MASS ON A CARRIER

CROSS-REFERENCE TO RELATED APPLICATION

This application claims priority to German Patent Application No. 102023125663.7, filed Sep. 21, 2023, with the same title as listed above. The above-mentioned patent application is incorporated herein by reference in its entirety.

TECHNICAL FIELD

The present invention relates to an apparatus for filling and/or portioning food mass on a carrier, comprising a machine frame, a carrier movably arranged on the frame, for receiving dispensed food mass, and a drive means for moving the carrier.

The present invention also relates to a method for filling and/or portioning food mass on a movable carrier.

BACKGROUND

Such devices are known from the prior art, for example for producing biscuits or for providing different food mass portions in a particular arrangement on metal sheets, in glass jars or in other types of packaging. A dispensing device for dispensing food mass provides a strand or single portions of food mass and is designed in that respect as a portioning unit known in various embodiments in the food technology field, in order to produce separate portions of a food mass and to deposit them on a carrier such as a metal sheet or the like. In addition to provide such portions, it is also possible to fill packaging arranged on the carrier with a food mass. In an apparatus or machine for producing biscuits, separately formed portions of biscuit dough are firstly placed on a conveyor belt and transferred from there to a carrier, for example a baking tray, on which the portions are laid next to each other in several rows. The carrier in the form of a metal sheet is mounted on a machine frame and can be moved in one direction such that new rows of biscuit portions are laid one after the other on the metal sheet. In this machine, the metal sheet on which the biscuit portions are to be arranged is moved relative to the dispensing device embodied as a portioning unit.

As alternatives, there are also known devices in which a dispensing device or portioning unit is moved relative to a carrier, for example a metal sheet. To that end, the dispensing device for dispensing a free-flowing food mass can be moved above the carrier with the aid of drive units, for example, in particular in two directions within a plane, at least, which can be referred to as X and Y axes.

One problem with devices in which a dispensing device or portioning unit must be moved above and relative to a carrier is that the free-flowing food mass must be fed through a pipeline, for example a flexible tube, and in many cases over longer distances, to the dispensing device for dispensing the free-flowing food mass. The quality of the product is adversely affected as a result. The pipeline must also be routed over a longer distance.

A complex apparatus is required in the case of devices where the carrier is moved relative to a dispensing device such as a portioning unit. For example, a carrier in the form of a metal sheet can be moved in one direction by a conveyor belt so that successive portions of the food mass can be placed on the carrier, for example in one or more adjacent rows. The disadvantage that can arise here is that parts of the food mass inadvertently end up in the region of a conveyor belt or other conveyor equipment, which may give rise to problems with hygiene. There may also be limitations regarding the direction of movement, particularly when a conveyor belt only allows movement in one direction. This can limit the way in which portions of the food mass are placed on a carrier, such as a metal sheet. This means it is not possible to create patterns or arrangements of single food portions on a carrier at will.

The object of the present invention is to specify an apparatus and a method for filling and/or portioning food mass on a movable carrier, with which the carriers can be moved in a versatile and reliable manner and which are hygienic and simple to clean. Another object, in particular, is that portions of food mass can be arranged on the carrier in different arrangements, or that a provided packaging can be filled with food mass.

SUMMARY

The invention achieves its object with an apparatus of the kind initially specified, in that

- a mechanical separator is provided for mechanically separating the carrier and the drive means,
- the carrier is arranged above the separator,
- the drive means is arranged at least partly below the separator,
- and in that the carrier and the drive means are coupled with the aid of magnetic and/or electromagnetic means in such a way that the carrier can be moved by the drive means using magnetic or electromagnetic force.

By the separator according to the invention, the carrier and the drive means for moving the carrier are mechanically separated to a large extent or indeed completely. This can prevent food mass from a dispensing device or portioning device from ending up in the region of the drive means for moving the carrier. This has significant advantages for hygiene. Any contamination of parts of the drive means is thus prevented in a reliable manner. The carrier is arranged above the mechanical separator, and the drive means is arranged at least partly below the separator. According to the invention, a force required to move the carrier for the preferably portioned food masses is transferred using magnetic and/or electromagnetic means and forces. For that purpose, carriers, the mechanical separator and the drive means are designed and configured in such a way that a magnetic or electromagnetic force is transmitted through the mechanical separator and onto the carrier. To that end, the drive means has movable magnets, for example, preferably permanent magnets, and/or, alternatively, movable induction coils, which transmit a magnetic force onto respectively designed sections of the carrier itself, or onto components such as magnets or electromagnetic coils that are arranged on the carrier. A magnetic driving force can thus be transmitted from the drive means onto the carrier via the mechanical separator. The components of the drive means that are arranged below the mechanical separator, for example a movable mechanism or kinematics, motors such as electric motors, or guide means such as linear guide means, are thus separated mechanically and hence also hygienically from the carriers and from the food masses to be processed by the apparatus according to the invention. In other words, the drive means and its associated movable mechanism or other components can be enclosed in a housing and hygienically separated from the food masses to be processed. With the aid of the magnetic and/or electromagnetic means, it is possible for the force for moving the carrier to be applied to the carrier in such a versatile manner that the carrier can be moved easily in several directions as need be, for example in the X and the Y direction. In this way, it is also possible to avoid the dispensing device or portioning unit for providing the food being itself movable. Instead, it can be mounted stationarily, for example on the machine frame or other frames adjacent to the apparatus. According to the invention, portions of food mass can be provided on a carrier, or packagings can also be filled with food mass. Another advantage of the invention is that the coupling can be released when a specific amount of force is exceeded, or in other words the drive means and the carrier can be decoupled from one another when a specific amount of force is exceeded. This can be achieved by dimensioning the magnetic and/or electromagnetic means appropriately, in particular by dimensioning a permanent magnet so that only forces up to a particular magnitude can be transmitted and when these forces generated by magnetic means are exceeded, the movably arranged carriers are no longer moved. This enhances the safety of the apparatus, because if a person comes into contact with the carrier being moved and a certain amount of force of exceeded, the carrier is no longer moved with greater force. The forces acting on the person can thus be limited, and potential injuries due to crushing or shearing, for example, can be prevented, according to the invention.

According to a particularly preferred embodiment, the mechanical separator is designed as a plate having a substantially planar upper surface, and the carrier rests on the plate and can be moved therealong by the drive means. Such a flat plate makes it easy to manufacture the mechanical separator so that it meets high standards of hygiene. The carrier rests on the preferably planar, smooth surface, where it can be moved back and forth. Low-friction materials are preferably selected, so that the magnetic forces (or electromagnetic forces) for moving the carrier on the plate can be kept to a minimum. The carrier may be designed, in particular, as a sheet made of metal or also of other materials such as plastic. The carrier may also be made of such a material that it can be gripped and moved using magnetic forces. Alternatively, a magnet that cooperates with a magnet forming part of the drive means may also be attached to the carrier.

The mechanical separator is preferably made of the following materials: according to a preferred embodiment, the plate is made of a non-magnetic material, in particular a metal, a metal alloy, in particular stainless steel, or a plastic, and is mounted directly or indirectly on the machine frame. These materials are well able to provide magnetic forces passing through them, and meet high standards of hygiene required for food machines.

According to another preferred embodiment, the drive means has a magnet holder and at least one permanent magnet or electromagnet arranged below the separator and on the magnet holder of the drive means. A permanent magnet or electromagnet can be easily attached to a matching magnet holder that forms part of the drive means below the mechanical separator. A cylindrical permanent magnet, for example, may be placed in a magnet holder having a matchingly shaped cylindrical cavity in which the magnet is arranged. Other shapes are also conceivable and purposeful here.

According to a preferred embodiment, the drive means has a mechanical and/or electrical guide unit for moving the magnet in the X/Y direction substantially in a plane below the separator. The drive means accordingly has a guide unit for moving the magnet back and forth at will in the X/Y direction in a horizontal plane. The magnet is preferably arranged relatively close to a part or component in the region of the food mass carrier and that similarly acts magnetically. For that purpose, it is advantageous if the separator is designed as a relatively thin plate or relatively thin component with a thickness of 1 to 15 mm, preferably 1 to 5 mm in the case of a metal plate and 5 to 15 mm in the case of a plastic plate, although these dimensions are not to be understood in a limiting sense according to the invention.

To move something in the X/Y direction, the drive means purposefully has at least two independently drivable motors, in particular electric motors for driving movement and for operating the guide unit. In this way, any kind of movement in the X and Y direction can be performed. To that end, the motors of the drive means are preferably coupled to a controller. In this way, any or almost any pattern of food portions can be realised on the carrier, in particular on a metal sheet or the like, or inside glass jars or other types of packaging. The food portions can be positioned on the carrier in multiple rows or also offset from each other in the X and/or Y direction by moving the magnet accordingly so that the carrier is moved accordingly relative to the dispensing device for dispensing the food mass, or relative to a portioning unit.

It has been found to be advantageous and purposeful if the guide unit is designed as a delta mechanism with two drives. According to a preferred embodiment, it is proposed that the delta mechanism has two articulated arms, wherein each articulated arm has a first rotatably mounted arm that can be pivoted by a motor, and a second arm rotatably mounted on the first arm, wherein the second arm is rotatably articulated on the magnet holder. A reliably operating and versatile drive means having a guide unit for moving a magnet or a magnetic coil can thus be realised.

According to an alternative embodiment, it is proposed that the guide unit has two linear guide means and two drives for moving the magnet holder in the X/Y direction. The linear guide means are preferably arranged with their longitudinal axes substantially perpendicular to each other.

According to another preferred embodiment of the invention, the magnet holder has a recess inside which the at least one magnet is arranged directly below the underside of the separator and is fixed in place in a simple and reliable manner.

It is preferred that the carrier arranged above the separator also has at least one permanent magnet. It is proposed and purposeful that the at least one magnet arranged on the carrier is arranged inside a recess on the underside of the carrier and is arranged directly above the separator in order to cooperate in operation with, and be coupled by magnetic force to at least one magnet of the drive means.

According to the invention, a dispensing device is preferably provided for dispensing food mass and is arranged on or relative to the machine frame in such a way that dispensed food mass lands on the movable carrier.

The apparatus or machine according to the invention preferably also has a controller which is configured to control the drive means for moving the carrier, and the dispensing device for dispensing food mass, in such a way that food mass can be produced in portions on the carrier.

It is particularly preferred that the controller controls the drive means and the dispensing device in such a way that separate portions of food mass are produced in different arrangements and/or patterns on the carrier, in particular in a plurality of rows or offset in relation to one another in the X and/or Y direction.

According to another aspect of the invention, the object of the invention is achieved by an apparatus which is characterised in that the linear guide means or the articulated arms are arranged substantially within a plane which is below a plane defined by the carrier. According to this aspect of the invention, either a linear guide arrangement having two linear guide means is provided, or articulated arms are provided, which allow the carrier to be moved due to a coupling, wherein the linear guide means or articulated arms are arranged substantially in a plane below a plane defined by the carrier. This allows the carrier to be arranged on top and be ready to receive food mass either directly or with a metal sheet or a container inbetween, whereas the drive means and the guide unit are arranged below that, i.e. at the bottom. This allows clean separation. The drive means and the carrier can be coupled by various mechanical, electrical and/or magnetic means. A particularly preferred embodiment is one like the kind described in the foregoing, or an embodiment of the invention according to the first aspect.

It is advantageous if the plane of the linear guide means or the articulated arms is arranged substantially parallel to a plane defined by the carrier and is preferably substantially horizontal.

According to another aspect, the object of the invention is achieved by an apparatus which is characterised in that the drive means has a guide unit which is designed as a delta mechanism having at least two articulated arms and three drives, and in that the guide unit and the carrier are coupled to each other in such a way that the carrier can be moved substantially within a plane in the X/Y direction and can be rotated by the controller of the drives. By such a delta mechanism according to the invention, having at least two articulated arms and three drives that can be individually controlled, food mass can be deposited on the carrier from above either directly, or indirectly using a metal sheet or containers or the like, in such a way that curved and/or straight shapes of the deposited food mass can be produced on the carrier. This is achieved by having three individually controllable drives, and by the articulated arms being controllable in various ways with the aid of a kinematic control element, so that the carrier is moved in a plane in the X/Y direction and/or is also rotated. This allows special shapes of the food mass to be produced on the carrier, or metal sheet, or container, or the like.

The following shapes can be produced, for example:

- circles or sections of a circle,
- concentric circles,
- sections of a spiral,
- meandering shapes,
- letters and/or numbers,
- a combination of straight and curved shapes,
- geometric free forms or special defined shapes as a copy of a template such as an angel figure, a Christmas tree or a logo.

According to a further aspect, the object of the invention is achieved by a method. This method according to the invention is preferably applied using an apparatus of the kind described in the foregoing, according to all the embodiments of all the aspects of the invention. With regard to the advantages achieved by the apparatus and the method, and also with regard to the products that can be produced, reference is made to the above descriptions in their entirety.

The aforementioned effects and advantages of the apparatus, and the object described above, are also achieved in equal measure by a method. This is a method for providing food mass on a carrier, in particular by using an apparatus according to the above, in which a carrier for receiving food mass and arranged movably in relation to a machine frame is provided, and the carrier is moved relative to the frame with the aid of a drive means, while food mass which has preferably been portioned is dispensed and deposited onto the carrier with the aid of a dispensing device, wherein the carrier is moved in operation above a mechanical separator for mechanically separating the carrier and the drive means with the aid of a drive means arranged below the separator, wherein the carrier and the drive means are coupled to each other with the aid of magnetic and/or electromagnetic means in such a way that the carrier can be moved by the drive means using magnetic or electromagnetic force.

To avoid repetition, reference is made to all the descriptions of the apparatus in the foregoing and the following, and in addition to the method.

BRIEF DESCRIPTION OF THE DRAWINGS

The apparatus according to the invention and the method according to the invention are described below with reference to several embodiments and the Figures, in which:

FIG. 16 shows a further embodiment of a portioning arrangement according to the invention, produced by methods according to the invention.

FIG. 17 shows a further embodiment of a portioning arrangement according to the invention, produced by methods according to the invention.

FIG. 18 shows a further embodiment of a portioning arrangement according to the invention, produced by methods according to the invention.

DETAILED DESCRIPTION

Apparatus (or machine) 1 shown in the Figures is used to provide portions of food mass, for example dough, sausage meat, cheese or the like on a carrier 2, such as a substantially rectangular metal (baking) tray or other containers such as glass jars, or packagings or the like. Carriers 2 are designed here by way of example as rectangular metal sheets, in particular as baking trays.

Figures 1, 2:
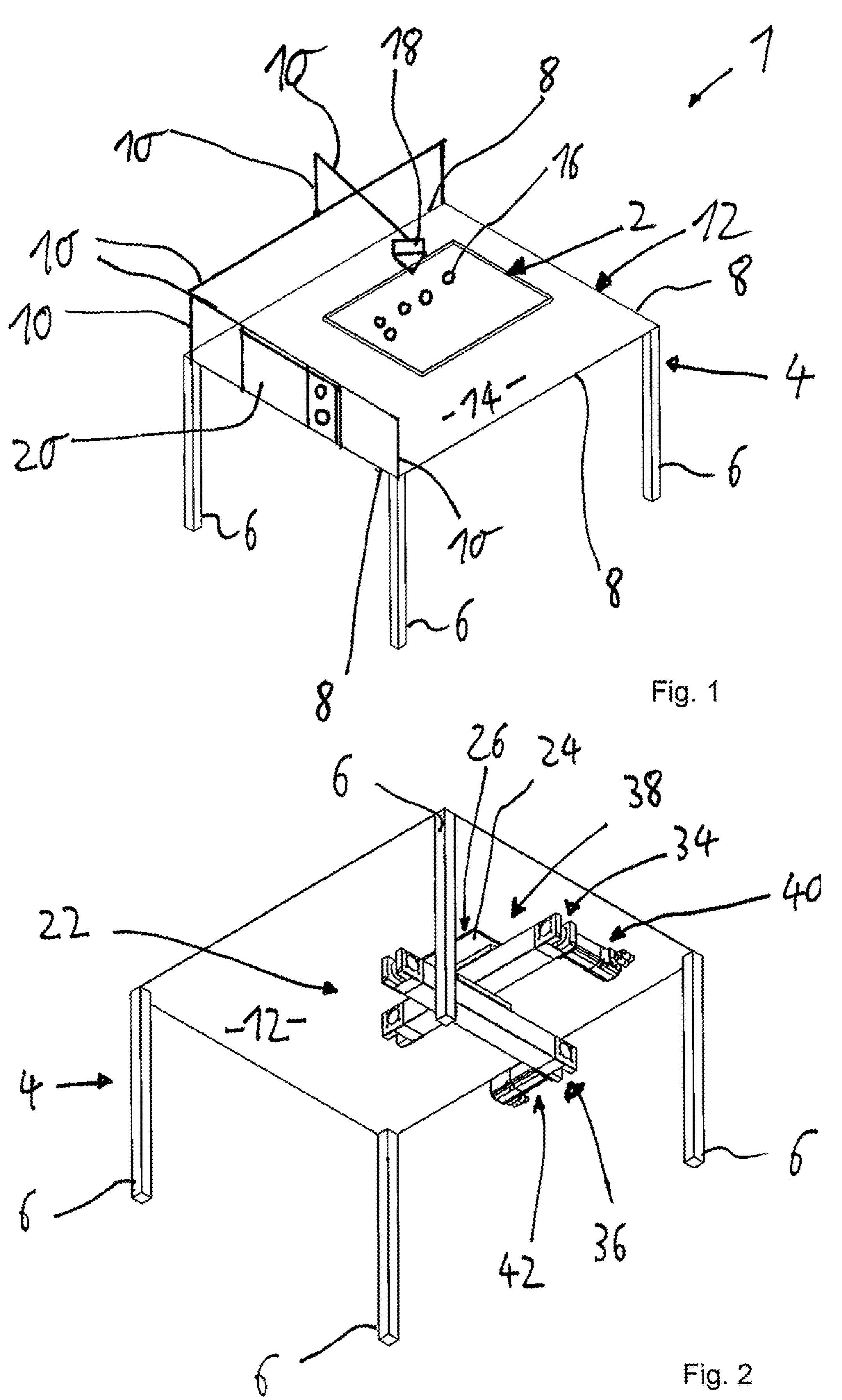
FIG. 1 shows a perspective top view of an apparatus according to the invention, comprising a machine frame and a carrier movably arranged thereon for receiving food mass.
FIG. 2 shows a perspective view of a first embodiment of the apparatus according to FIG. 1, as seen at an angle from below, with a drive means arranged below a mechanical separator.

The apparatus shown schematically in FIG. 1, in particular, has a machine frame 4 which preferably includes four legs 6 that may also be fitted with rollers at their bottom end, in a manner not shown, for moving apparatus 1. Frame 4 further comprises, in a known manner, a plurality of horizontal struts 8 as well as additional mounting rods 19 fastened to struts 8. Depending on requirements, frame 4 can be adapted to the respective configuration of the machine and additional components.

A mechanical separator 12 is mounted on frame 4 and is designed by way of example as a plate-shaped component or plate 14. Separating device 12 has, for example, a substantially rectangular shape or a thickness in the range from 0.5 to 3 mm. It can be made of various materials, such as a non-magnetic material, in particular a metal, a metal alloy, in particular of stainless steel such as V2A, or alternatively of plastic. The separator 12 designed as a plate 14 may also have other shapes, for example a cuboid shape or a very elongated shape.

Apparatus 1 further comprises at least one carrier 2 for receiving food mass, in particular portions 16 of food mass, and which is mounted or arranged on frame 4 or movably relative to frame 4. Carrier 2 is preferably designed as a baking tray and may optionally have an edge. Carrier 2 preferably has a substantially planar, downwardly facing surface and preferably likewise a substantially planar upper surface. In operation, carrier 2 preferably rests flush on and is thus supported by separator 12, which is designed as a plate 14. The dimensions of carrier 2 are (substantially) smaller than the dimensions of separator 12, so carrier 2 can be arranged in different positions relative to the plate-shaped separator 12 by moving it accordingly. This is described in more detail below. Multiple portions 16 of a food mass, for example dough, biscuits or like, can be arranged on the upward facing surface of carrier 2. Portions 16 are shown only by way of example and in schematic form. They may have different shapes, for example round, polygonal, oval, or the like. They can be arranged in different positions on carrier 2, for example in rows, multiple rows, offset from each other or in almost any position. Alternatively, the carrier may also be designed as a container, as a glass, a sheet metal container, a plastic tray, or the like.

Apparatus 1 preferably includes a portioning unit of the kind known from the prior art for providing portions of food mass, or a dispensing device 18, shown schematically in the embodiment, for dispensing preferably portioned free-flowing food mass. With the aid of matching rods 10 or other mechanical fastening means, dispensing device 18 may be stationary or can preferably also be positioned in different positions relative to frame 4 or separator 12. Portions of the food mass can thus be dispensed preferably with the aid of dispensing device 18. In the embodiment, dispensing device 18 is designed as a nozzle arrangement with which the free-flowing food mass can be dispensed. In a manner that is known but not shown, the dispensing device can be coupled to a source of food mass, preferably a container, by pipelines or tubes. With the aid of a pump, not shown, the food mass can be conveyed continuously or intermittently and can also be dispensed, if necessary, with the aid of controllable valves so that the food mass is formed as separate portions 16 on carrier 2.

Instead of a dispensing device 18 of the kind shown schematically here, the latter can also be designed as a portioning unit for providing different portions of food mass, or also as a conveyor belt with which individual portions, for example of biscuits to be produced, can be dispensed on carrier 2.

A controller 20 having at least one data storage unit and at least one processor is provided, and in the embodiment is likewise mounted on rods 10 or other fastening means on or relative to frame 4 and configured to control and operate individual components of apparatus 1, to record and process sensor signals, and the like. The controller includes, in a manner known from the prior art, at least one display device and a plurality of operating elements and interfaces for transmitting signals and data. A controller of an adjacent machine could also be configured accordingly to perform the function of a controller 20 as described in more detail below.

As illustrated by FIG. 2, a drive means 22 is provided and designed to move the at least one carrier 2, in the embodiment to move carrier 2 in a horizontal plane and in the X/Y direction. In a manner not shown in further detail, drive means 22, which is designed as a plate, for example, is arranged and held on frame 4 and/or on the underside of separator 12. Appropriate mechanical means such as clamps, screws, holders and the like can be used for this purpose. Drive means 22 is arranged at least partly below, in the embodiment entirely below separator 12. Drive means 22 is designed and configured in such a way that it is able to move carrier 2, which is arranged above separator 12 on the upper side thereof, in several directions, in the embodiment in the X/Y direction. In the embodiment, drive means 22 and carrier 2 and also mechanical separator 12 are designed in such a way that carrier 2 and drive means 22 are coupled with the aid of magnetic and/or electromagnetic means in such a way that the carrier can be moved by drive means 22 using magnetic or electromagnetic force. As described by way of example below, drive means 22 is fitted for this purpose with at least one permanent magnet or electromagnetic coil, so that a magnetic or electromagnetic force can be applied at different places to carrier 2 in order to move it in the horizontal plane in the X and Y direction on the surface of plate 14. For that purpose, carrier 2 itself may be designed in such a way that magnetic forces can be transmitted to it, or that at least one permanent magnet or at least one electromagnetic coil is arranged on carrier 2, in which case a permanent magnet is preferred, or a material that allows the transmission of magnetic forces or electromagnetic forces is selected for the carrier.

Figure 3:
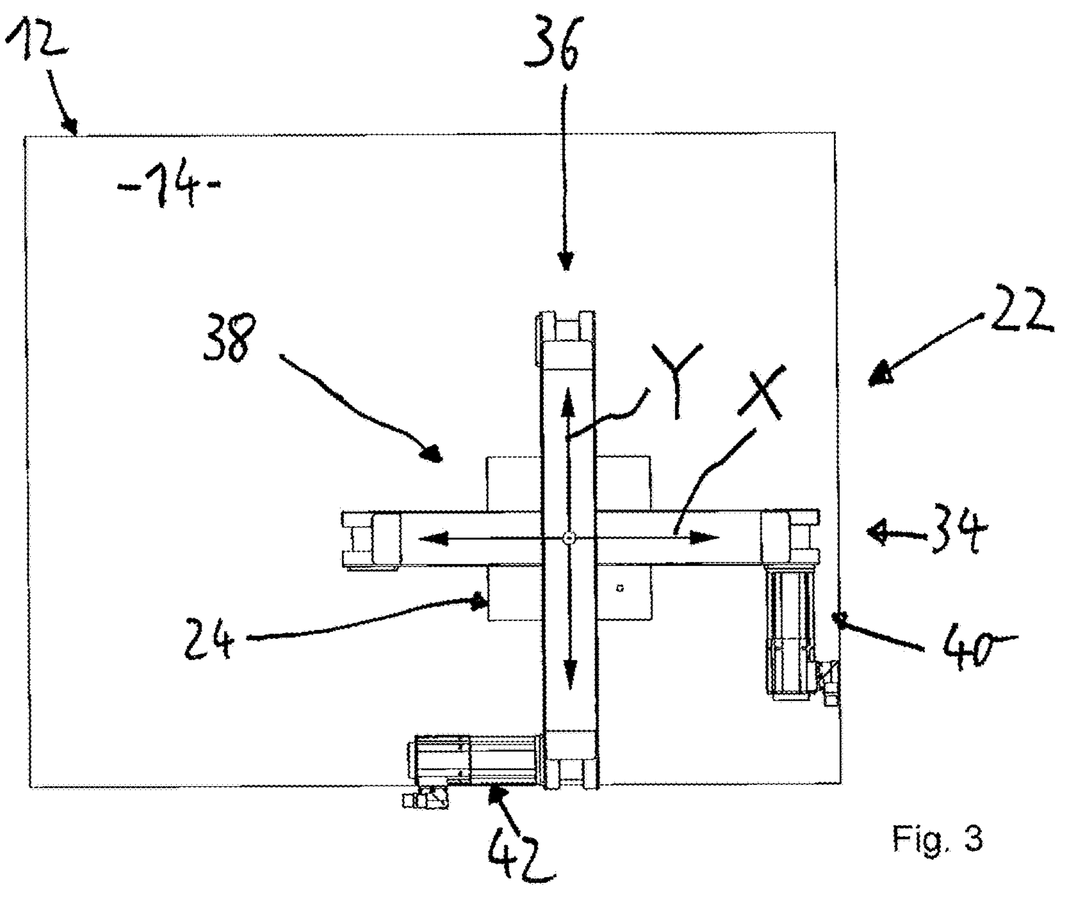
FIG. 3 shows a view from below of the apparatus with a drive means.
Figure 4:
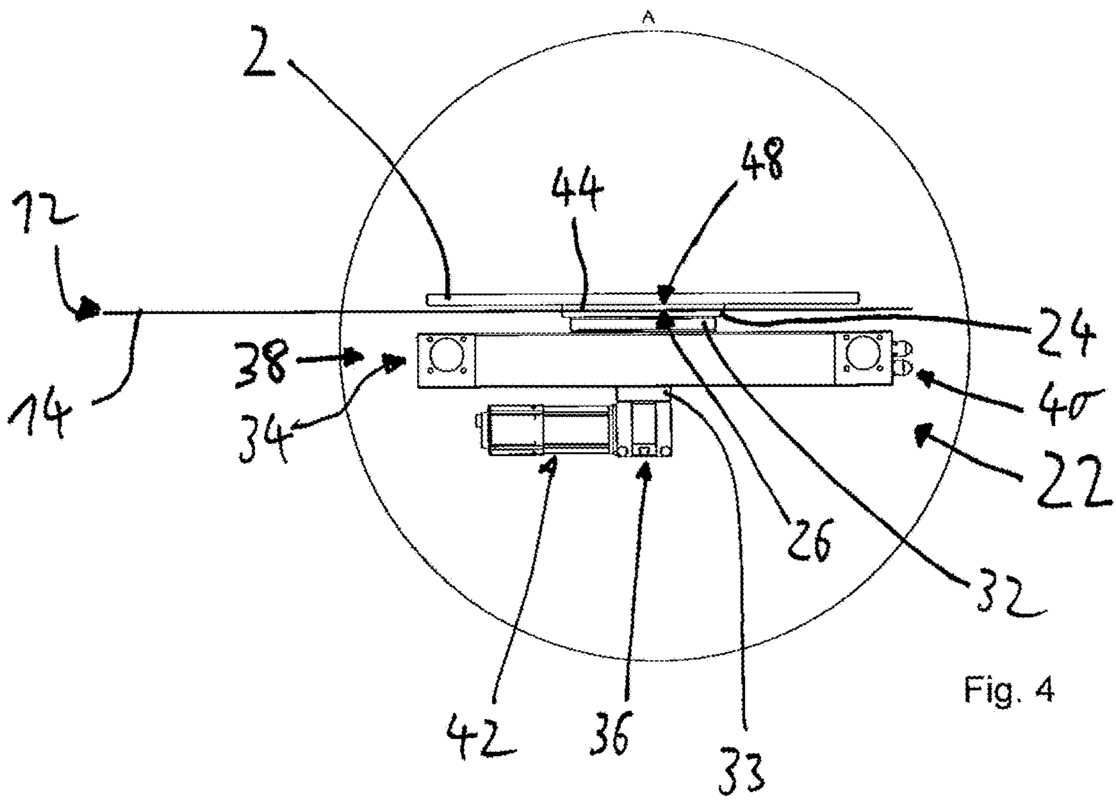
FIG. 4 shows a detail of the apparatus in a side view.

The view from below shown in FIG. 3 and the side view shown in FIG. 4 illustrate drive means 22, separator 12 arranged above the latter and provided in the form of plate 14, and carrier 2 arranged above separator 12.

As illustrated by FIGS. 2 to 5, the embodiment shown includes a drive means 22 having a magnet holder 24 and a permanent magnet 26 arranged on the latter. Carrier 24 has an upwardly opened recess 28 for receiving magnet 26; recess 28 and magnet 26 have matching shapes, for example a cylindrical or rectangular shape. The upwardly facing surface of magnet 26 is preferably flush with the upwardly facing surface of carrier 24, so the upwardly facing surface of magnet 26 abuts the lower surface of separator 12 in the form of plate 14, or is spaced a very small distance from it. Magnet holder 24, for its part, is preferably attached to a mounting block 30 that is arranged below it and that is mechanically coupled to a runner 32 of a first linear guide means 34. Linear guide means 34 is designed in a manner known per se in such a way that runner 32 and thus block 30 and ultimately carrier 24 and magnet 26 can be moved in or along one direction or axis (X). Guide means 34 is arranged on frame 4.

Linear guide means 34, for its part, is mechanically coupled to a second linear guide means 36 arranged perpendicular thereto, such that guide means 34 as a whole can also be moved in or along a different direction or different axis (Y). Overall, therefore, carrier 24 and magnet 26 can be moved in the X and Y direction. Guide means 36 is also mounted on frame 4. Guide means 34, 36 and the directions of movement, or axes X and Y, can also be seen in FIG. 3.

Overall, therefore, an electromechanical guide unit 38 for moving magnet 26 in the X/Y direction substantially in a plane below separator 12 is realised.

Drive means 22 also includes two preferably electric motors 40, 42 that are independently drivable and can be controlled by controller 20 (cf. FIG. 3), and that obtain electric energy, in a manner not shown in further detail, and are coupled by suitable signal lines to controller 20 (FIG. 1). The respective runners 32, 33 of linear guide means 34, 36 can be moved in such a way that they can ultimately move and position magnets 26 in the X and Y direction below separator 12.

Carrier 2 has a magnet holder 44 that has a recess 46 inside which the at least one magnet 48 is arranged directly above the upper side of separator 12. Magnet holder 44 is mechanically connected to carrier 2, which is preferably designed as a baking tray, for example by an adhesive, welded or screw connection.

Thus, by magnet carrier 44, an additional permanent magnet 48 is also provided on carrier 2 above separator 12. By the two magnets 26, 48, the magnetic force can be transmitted from the lower magnet 26 through separator 12 onto the upper magnet 48, which is coupled by magnet carrier 44 to carrier 2 for the food mass. Magnetic means are thus provided to transmit the described magnetic force or, alternatively, the electromagnetic force from drive means 22 through mechanical separator 12 onto carrier 2 by cooperating magnets 26 and 48. A complete mechanical separation between carrier 2 and drive means 22 is simultaneously realised by separator 12 in the form of plate 14.

By operating drive means 22 by controlling and operating motors 40, 42, carrier 2 can be moved into almost any position along the surface of separator 12, in the form of plate 14, and can be positioned relative to the position of dispensing device 18 so that the food mass portions can be applied to and preferably ejected onto at any desired points on carrier 2.

As already described, controller 20 is configured to control drive means 22 for moving carrier 2, and dispensing device 18 for dispensing food mass, in such a way that food mass can be produced in portions on carrier 2. Controller 20 controls drive means 22 and dispensing device 18 in such a way that separate portions of food mass are produced in different arrangements and/or patterns on carrier 2, in particular in a plurality of rows or offset to one another in the X and/or Y direction.

Figure 5:
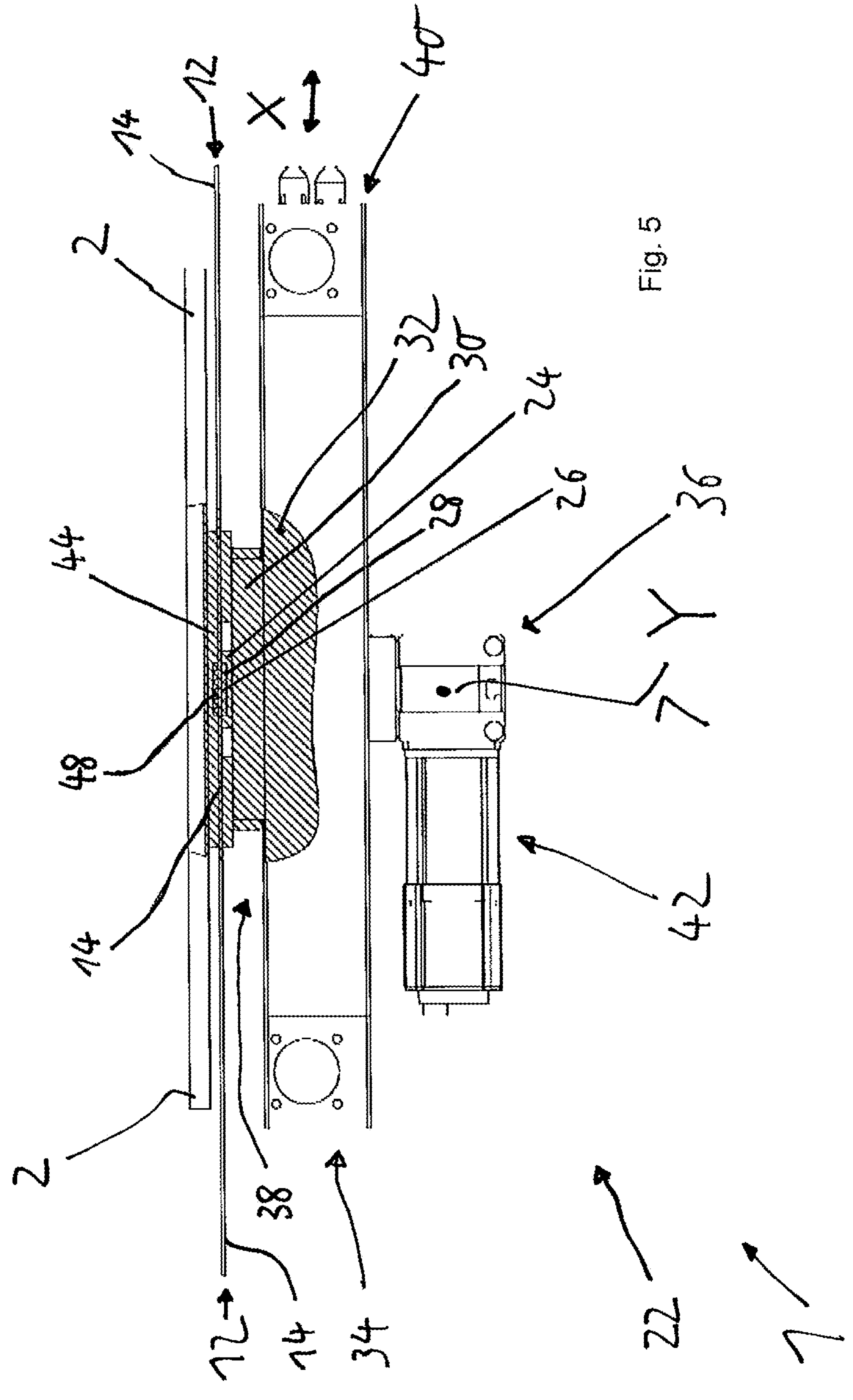
FIG. 5 shows the detail of the apparatus in a partial cross-sectional view from the side.
Figure 6:
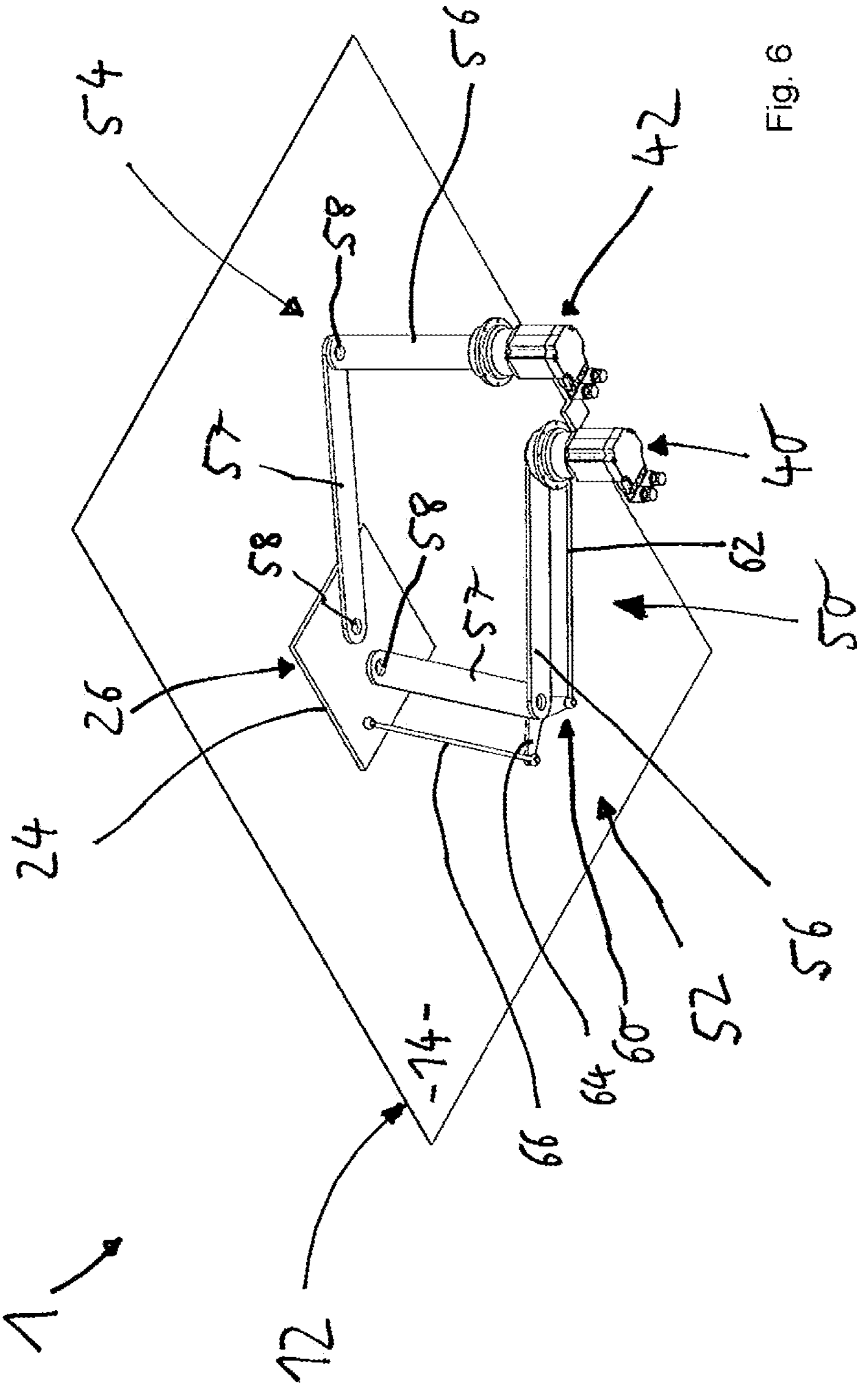
FIG. 6 shows a perspective view from below of an alternative embodiment of an apparatus according to the invention having an alternative drive means for moving the carrier above the separator by a delta mechanism.
Figure 7:
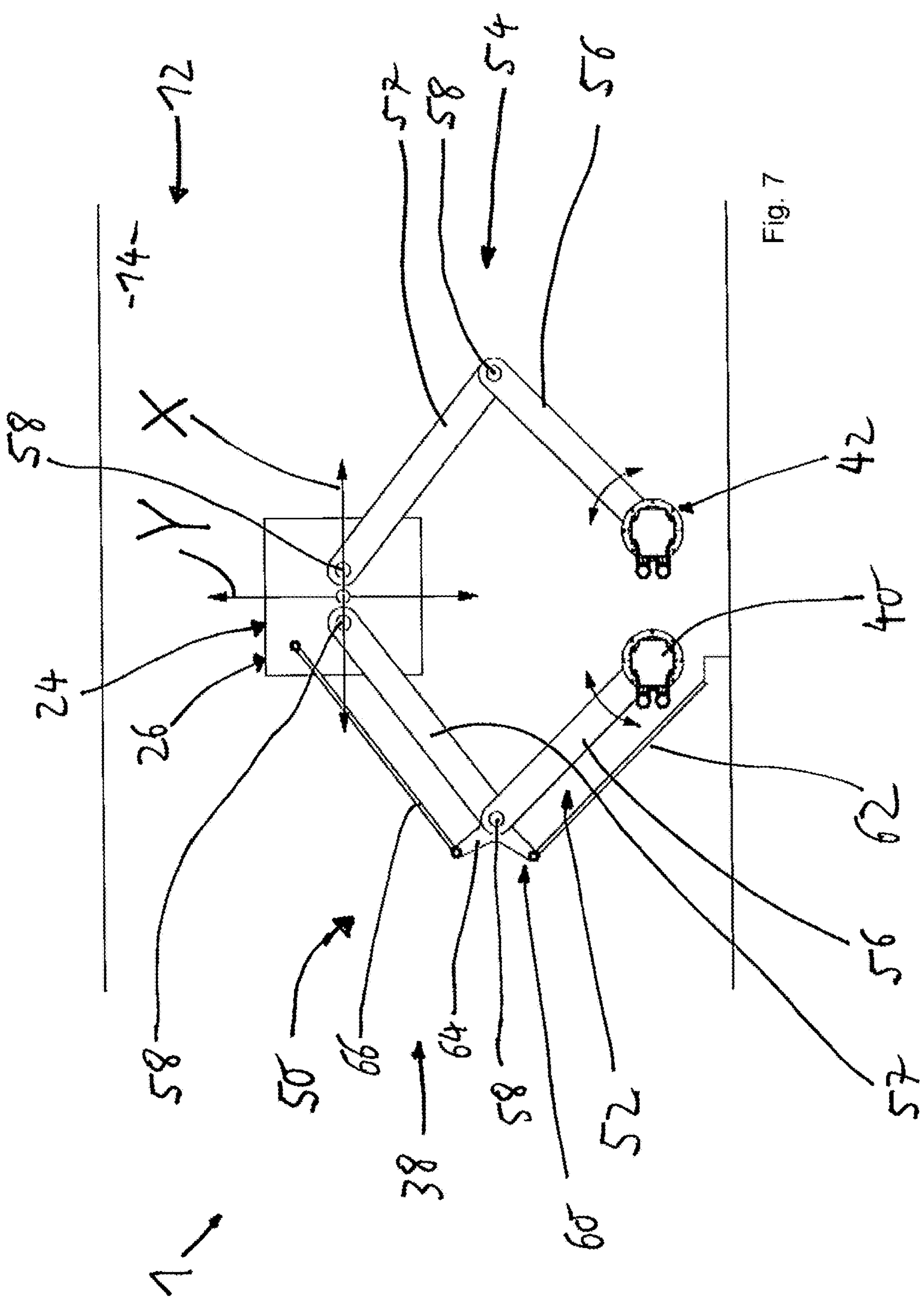
FIG. 7 shows a view from below of the apparatus shown in FIG. 6.

FIGS. 6 and 7 show an alternative apparatus 1 that is basically designed in the same way as apparatus 1 described above with reference to FIGS. 1 to 5, the only difference being that drive means 22 and guide unit 38 are not fitted with linear guide means 34, 36, but are designed instead as a delta mechanism 50. Where identical or functionally identical components are used, reference is made in their entirety to the above descriptions of the first embodiment of apparatus 1, which apply equally and mutatis mutandis to the second embodiment with delta mechanism 50; additional features and differences are described below.

As illustrated by FIGS. 6 and 7, guide unit 38 in the form of delta mechanism 50, which is arranged below the separating unit 12 in the form of plate 14, has two articulated arms 52, 54 each mounted on or relative to frame 4 (FIG. 1). Articulated arm 52 has a first rotatably mounted, pivoted arm 56, which is mounted rotatably relative to frame 4 and coupled to electric motor 40 by its one end, so that arm 56 can be pivoted back and forth as illustrated by the respective double arrow in FIG. 7. At the distal end of arm 56, a second arm 57 is pivotably hinged by an articulated joint 58. For its part, the second arm 57 is rotatably articulated on magnet holder 24 by an articulated joint 58. Articulated arm 54 is also designed accordingly, i.e. with a first arm 56 mounted pivotably on or relative to frame 4 and a second arm 57 which is mounted by an articulated joint on arm 56 and which is hingedly connected by its distal end to magnet holder 24 by an articulated joint 58. Arm 56 can be pivoted back and forth by motor 42, as illustrated by the double arrow in FIG. 7.

A kinematic control element 60 cooperates with articulated arm 52 and includes a first control rod 62 rotatably coupled at one end to frame 4, a two-armed control lever 64, which for its part is rotatably coupled by articulated joint 58 to the ends of arms 56, 57, and a control rod 66 which is rotatably coupled to control lever 64 by an articulated joint and which is also rotatably coupled to magnet holder 24. The coupling of control rod 66 and also of arms 57 to magnet holder 24 may be performed directly or also by a mounting block 30, as shown in FIG. 5 with reference to the first embodiment.

Motors 40, 42 can be operated by controller 20 in such a way that magnet holder 24, and thus the one magnet 26 or plurality of magnets 26 disposed on magnet holder 24, are moved below separator 12, in the form of plate 14, into any positions in the X direction and Y direction by articulated arms 52, 54 and kinematic control element 60, each with their individual components, in order to move magnets 26 into their positions. Due to the previously described coupling by the magnetic and/or electromagnetic means, in particular by magnet 26 and magnet 48, which is coupled to carrier 2 as shown in FIG. 5 in particular, it is also possible in the embodiment with delta mechanism 50 (FIGS. 6 and 7) to contactlessly move carrier 2, preferably in the form of a metal sheet or other container, entirely or largely above separator 12 in the X and Y direction, into different positions relative to a dispensing device 18 (FIG. 1), a portioning unit, or other means for dispensing food mass onto carrier 2.

Figure 8:
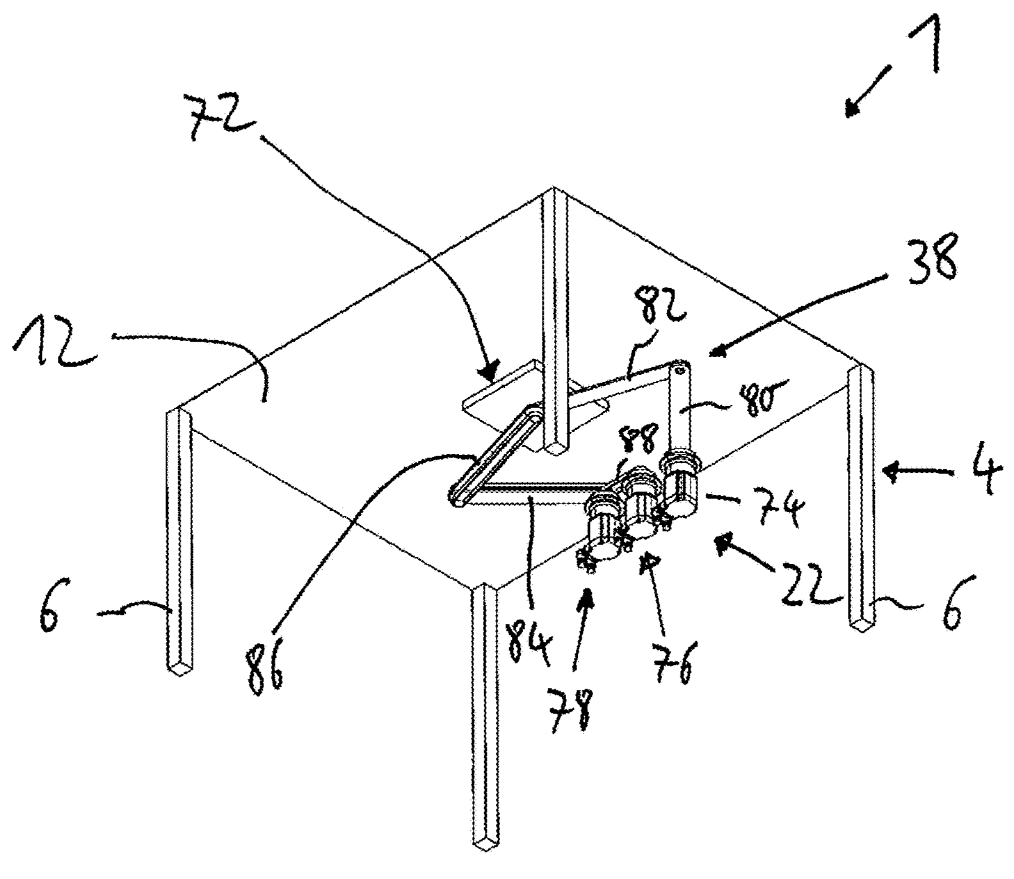
FIG. 8 shows a perspective view from below of a second embodiment of an apparatus.
Figure 9:
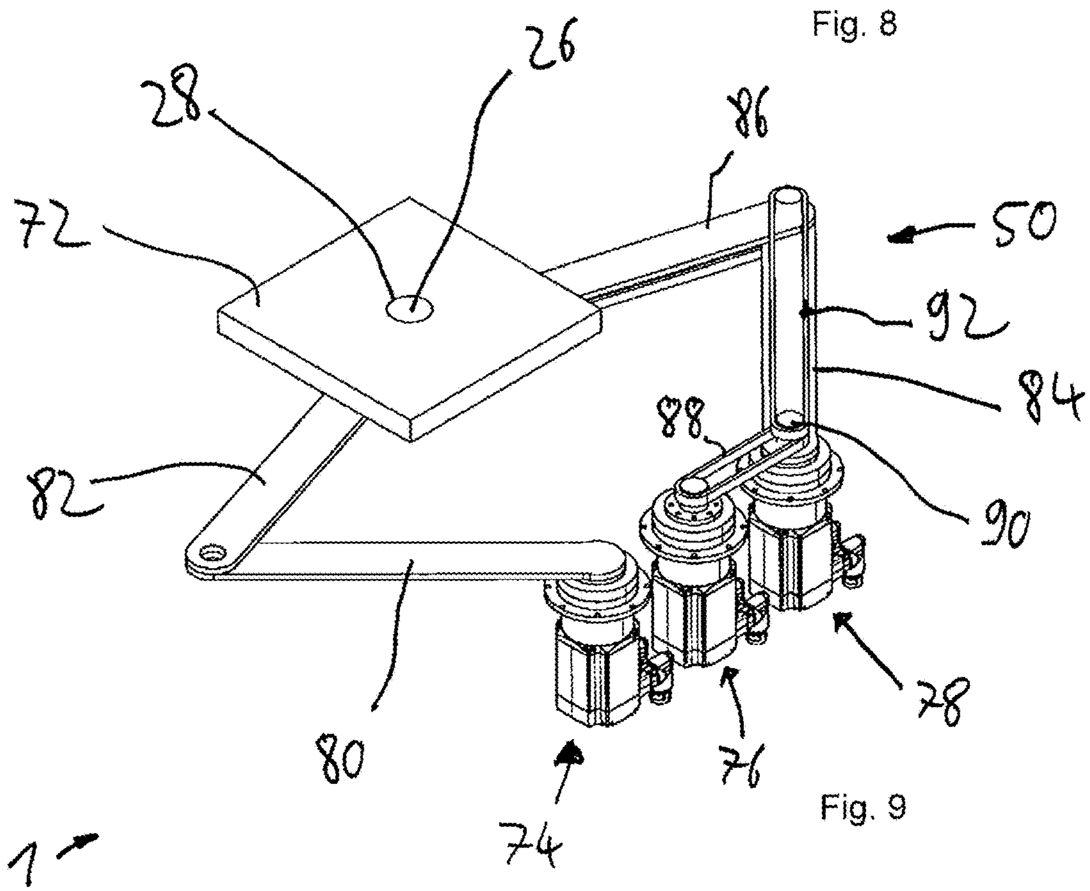
FIG. 9 shows a perspective view of the embodiment shown in FIG. 8, as seen at an angle from above.
Figures 10, 11:
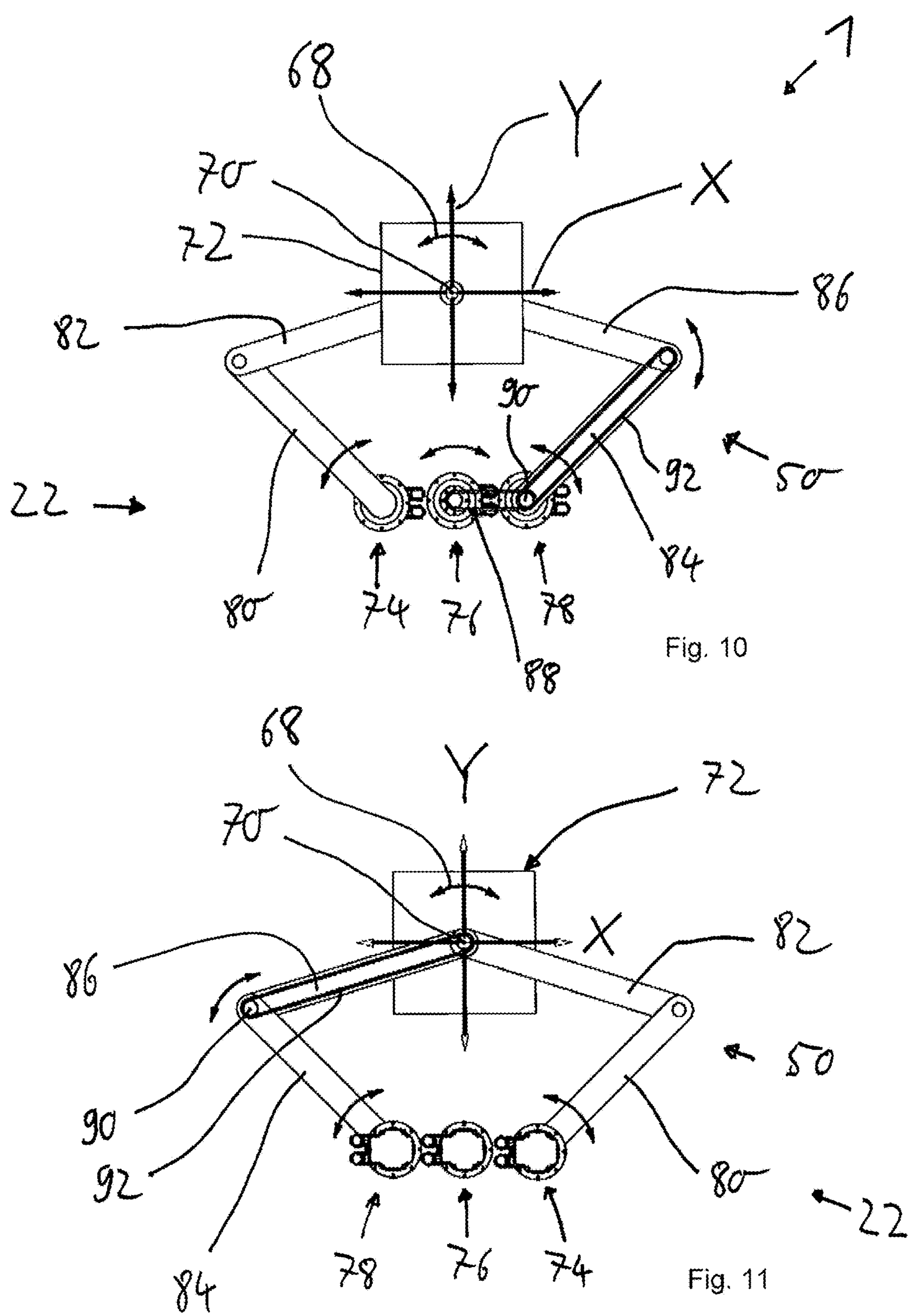
FIG. 10 shows a top view of the drive means shown in FIG. 9.
FIG. 11 shows a view from below of the drive means shown in FIG. 9.
Figures 12, 13:
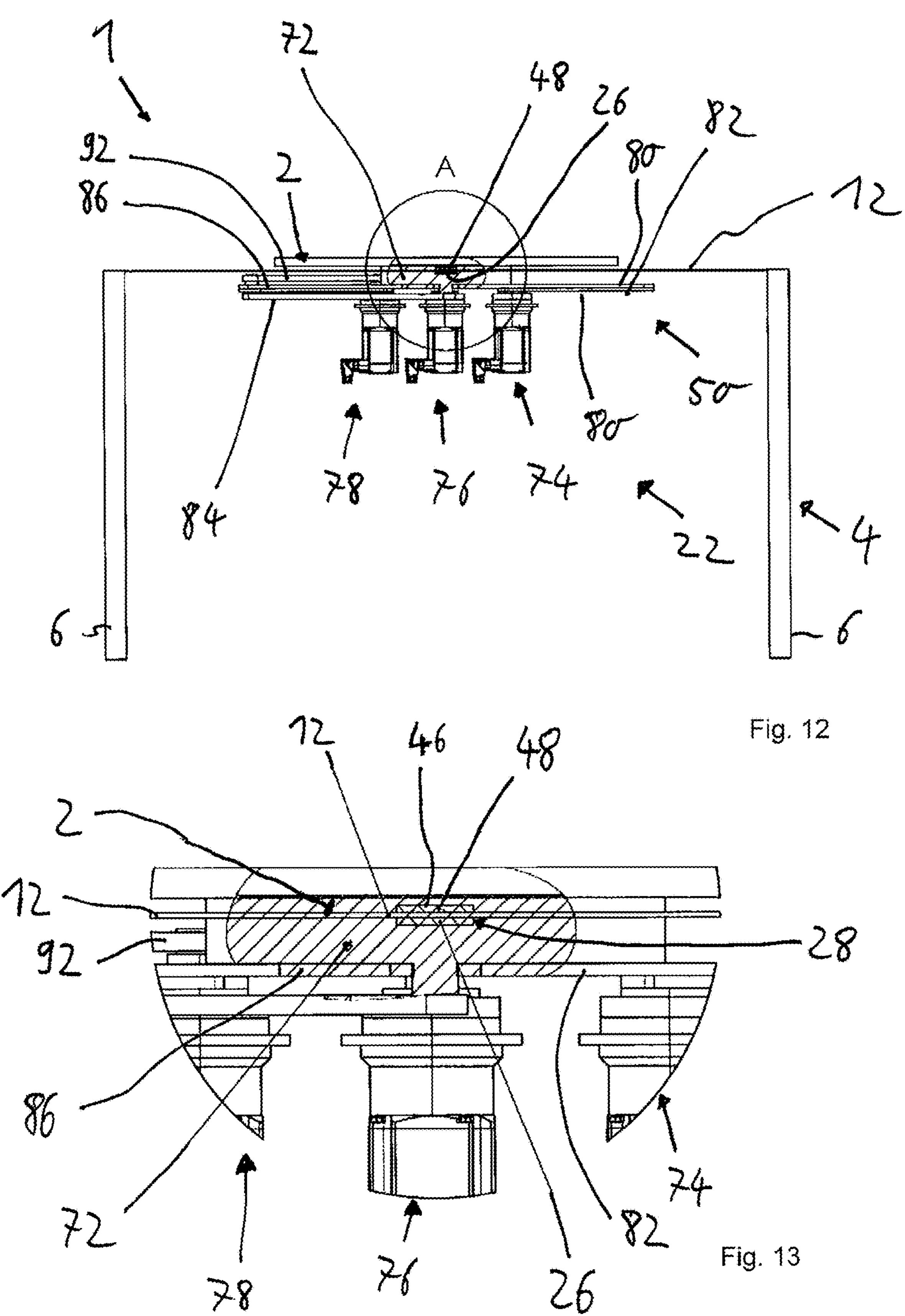
FIG. 12 shows a side view of the machine with drive means as shown in FIG. 8, together with a mechanical separator.
FIG. 13 shows an enlarged cross-sectional view of detail A from FIG. 12.

The alternative embodiment, shown in FIGS. 8 to 13, of an apparatus 1 for filling and/or portioning food mass directly on a carrier 2, or onto a metal sheet, container or the like which is arranged on carrier 2, has many similarities with the previously described embodiments. With regard to similarities and to identical or similar components, the same reference signs have been used, and reference is made in full to the descriptions above. Apparatus 1 as shown in these Figures also has an upper carrier 2 that can be moved in the X and Y direction by a drive means 22 and that is also rotatable, as also indicated by the arrows in FIGS. 10 and 11. The rotation that is possible is visualised by arrow 68 and rotational axis 70 (FIGS. 10 and 11), which is oriented substantially vertically in the embodiment. FIGS. 8 and 12 show the arrangement of drive unit 72, drive means 22 and guide unit 38 relative to the machine frame 4. Drive unit 72 is coupled to drive means 22 in a manner described in more detail below. It has a recess 28, inside which a magnet 26 is arranged.

A mechanical separator 12 (FIGS. 8, 12, 13), previously described with reference to the first embodiment, is designed as a relatively thin plate made of metal or plastic and is likewise mounted on machine frame 4. It is arranged directly above magnet 26 and drive unit 72 and extends substantially horizontally. A carrier 2 that is coupled in the embodiment by magnetic means to drive means 22 is arranged above separator 12. This magnetic coupling using magnetic means is configured in the embodiment in such a way that a magnet 48 is arranged and fastened in a lower recess 46 in carrier 2. Magnet 48 is operatively connected magnetically to magnet 26, which is coupled to drive unit 72. Due to the coupling, when drive unit 72 and magnet 26 are moved with the aid of drive means 22, magnet 48 and hence also carrier 2 are moved in the Y direction and the X direction, and if necessary are also rotated about rotational axis 70 (arrow 68), with the aid of magnetic means and/or alternatively also by electromagnetic means to a partial extent. Portions of food can be arranged directly or also indirectly on a metal sheet, container or the like on carrier 2 with the aid of a food dispensing device 18, which in this embodiment is also present and which is described with reference to the first embodiment (FIG. 1). In the embodiment, a magnetic force is transmitted by magnets 48 and 26 from drive means 22, or more precisely from drive unit 72 to carrier 2, which can be moved as a result in the manner described. Alternatively, an electric coil or a plurality thereof may also be used instead of permanent magnet 26, in order to produce an electromagnetic coupling with permanent magnet 48 to generate the forces needed to move carrier 2 in the required manner.

It is also possible, according to the invention, that instead of a pair of magnets comprising magnets 26, 46, a plurality of magnet pairs are formed in the magnet holder 24 according to the first embodiment or in the drive unit 72 of the second embodiment, and then correspondingly at the opposite positions on carrier 2. It is possible in that way for greater forces to be transmitted and also for the movement of carrier 2 to be guided more precisely. For example, four pairs of magnets arranged in a rectangle or square may be provided.

As FIGS. 8 to 13 also illustrate, drive means 22 has three drives 74, 76, 78 in the form of electric motors which are coupled to a delta mechanism 50.

Drive 74 is coupled for rotational movement to articulated arm 80, which in turn is rotatably coupled by its distal end to another articulated arm 82, which for its part is rotatably coupled to drive unit 72 at rotational axis 70.

Drive 78 is coupled to an articulated arm 84, which in turn is rotatably coupled by its distal end to another articulated arm 86, which for its part is also rotatably coupled by its distal end to drive unit 72. By driving drives 74 and 78, drive unit 72 and hence also magnet 26 can be moved in the X/Y direction by articulated arms 80, 82; 84, 86.

By a first belt 88, a coupling shaft 90 and a second belt 92 that is coupled in the region of rotational axis 70 to drive unit 72 by a drive shaft, the other drive 76 drives drive unit 72 rotationally with the result that drive unit 72 and hence also magnet 26 can be rotated directly, and hence also carrier 2 via the other magnet 48, as indicated by arrow 68.

The overall result is that a delta mechanism 50 according to the invention is realised that, by controlling drives 74, 76 and 78 accordingly, allows and causes a movement of carrier 2 in the X direction and the Y direction, and also its rotation about a rotational axis 70 as indicated by arrow 68. A conventional electrical/electronic controller 20 of apparatus 1 is used to control the drives, each of which is preferably embodied as an electric motor.

The manner of operation, and the method according to the invention, are preferably performed using the embodiments of apparatus 1 described in the foregoing. A method for providing food mass on a carrier 2 is accordingly performed, in which a carrier 2 for receiving food mass and arranged movably in relation to a machine frame 4 is provided, and carrier 2 is moved relative to frame 4 with the aid of a drive means 22, while food mass which has preferably been portioned is dispensed and deposited onto carrier 2 with the aid of a dispensing device 18, wherein carrier 2 is moved in operation, above a mechanical separator 12 for mechanically separating carrier 2 and drive means 22, with the aid of a drive means 22 arranged below separator 12, wherein carrier 2 and drive means 22 are coupled to each other with the aid of magnetic and/or electromagnetic means in such a way that carrier 2 can be moved by drive means 22 using magnetic or electromagnetic force.

Drive means 22, in particular motors 40, 42 and also a dispensing device 18 can be controlled with the aid of a controller 20 in such a way that the carrier can be moved and positioned in the Y direction and the X direction so that food mass, in particular individual portions, can be provided and placed on carrier 2 in almost any kind of pattern, for example in one or more rows, offset from each other in a chessboard pattern, or the like. By dispensing a free-flowing food mass more or less continuously from dispensing device 18, it is also possible to produce continuous, caterpillar-like shapes of food mass on carrier 2, in particular on a metal sheet, be it in straight lines or meandering, circular, elliptical or rectangular shapes, for example. By storing respective programs or algorithms in controller 20, guide unit 38 for magnet holder 24 can be moved almost at will, as can carrier 2 also, by magnet 48, while maintaining complete hygienic separation by the separator 12 embodied as plate 14.

Another method according to the invention is carried out with the aid of the apparatus 1 according to FIGS. 8 to 13. With the aid of the controller, drives 74, 76, 78, and thus articulated arms 80, 82, 84 and thus drive unit 72 and thus the at least one magnet 26 and thus indirectly with the aid of magnetic or electromagnetic forces, it is also possible for magnet 48 and thus carrier 2 to be moved in the X direction and the Y direction and also rotationally about a rotational axis 70. This allows the carrier to be moved in such a way along straight and/or curved paths of almost any trajectory, that with the aid of a food dispensing device 18 for dispensing strands or points of a free-flowing food mass, or for dispensing solid food portions, any desired, curved and/or straight shapes of food mass can be deposited directly on the carrier, or on an a metal sheet, or in packaging, or on an arrangement of food that has already been deposited.

By way of example, FIGS. 14 to 18 show embodiments of food mass shapes deposited according to the invention on the carrier or metal sheets or containers or the like with the aid of the apparatuses according to the invention.

Figure 14:
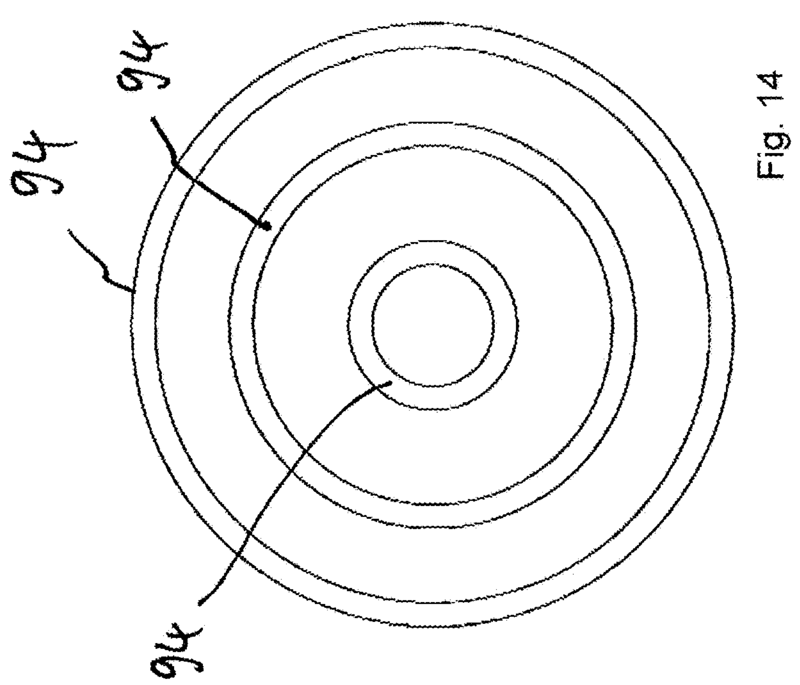
FIG. 14 shows a portioning arrangement according to the invention, produced by a method according to the invention.

FIG. 14 shows several concentric circles 94 made of food strands, whereby circles 94 have different diameters. The thickness of the strands of food mass can be varied according to the settings of dispensing device 18. Circles 94 obviously involve the food mass following a curved path.

Figure 15:
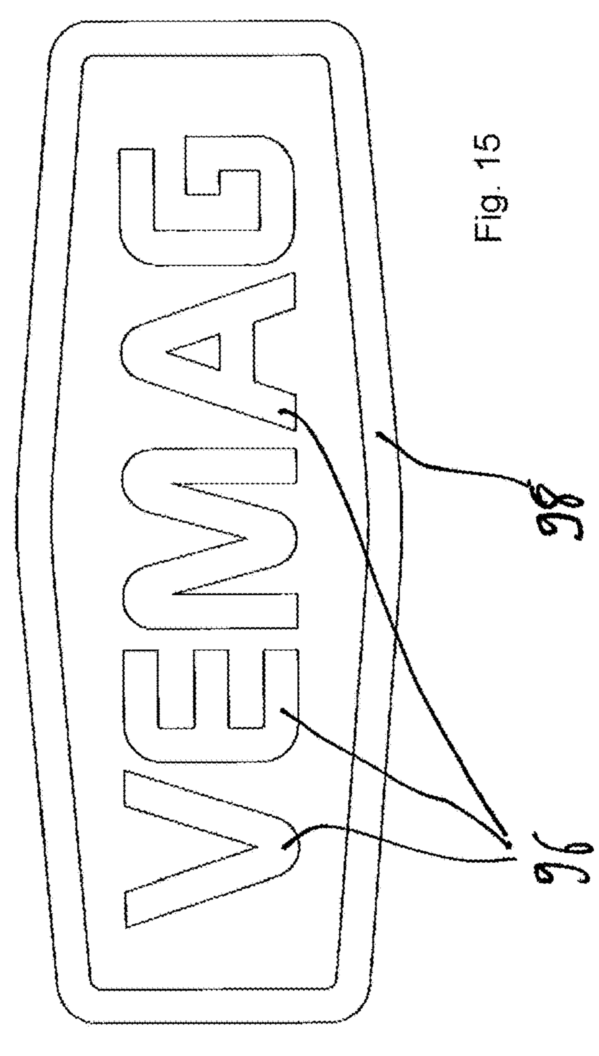
FIG. 15 shows a further embodiment of a portioning arrangement according to the invention, produced by methods according to the invention.

FIG. 15 shows, by way of example, a logo comprising several letters 96 that form the company name of the applicant, within a hexagonal frame 98 having a substantially square profile. Both letters 96 and frame 98 have some straight sections of food mass and some curved sections of food mass.

FIG. 16 shows a meandering shape 100, by way of example. Alternatively, shape 100 could also be a kind of spiral. This shape 100 also shows not only substantially curved sections, but also small sections that are substantially straight.

FIG. 17 shows, by way of example, a kind of fish shape 102, which can be produced directly or indirectly on a carrier 2 by the method according to the invention, using apparatus 1 according to the invention. Here, too, there are some straight and some curved sections of food mass.

FIG. 18 shows, by way of example, a spiral food shape 104 produced directly or indirectly on carrier 2 according to the invention.

It is clearly apparent to a person skilled in the art that, due to carrier 2 being movable in the X direction and the Y direction and/or its being rotatable, almost any shape of food mass can be produced on carrier 2 either directly or indirectly (on a metal sheet, container, or the like) with the aid of the apparatus according to the invention.

The embodiments described above are only descriptions of preferred embodiments of the present invention, and are not intended to limit the scope of the present invention. Various variations and modifications can be made to the technical solution of the present invention by those of ordinary skills in the art, without departing from the design and spirit of the present invention. The variations and modifications should all fall within the scope defined by the claims of the present invention.

What is claimed is:

1. An apparatus (1) for portioning food mass on a carrier (2), comprising:

a machine frame (4), a carrier (2) movably arranged on the frame (4), for receiving dispensed food mass, a drive means (22) for moving the carrier (2), a dispensing device (18) for dispensing food mass and which is arranged on or relative to the machine frame (4) in such a way that dispensed food mass lands on the movable carrier (2), and a controller (20) configured to control the drive means (22) for moving the carrier (2) and configured to control the dispensing device (18) for dispensing food mass, wherein:

a mechanical separator (12) is provided for mechanically separating the carrier (2) and the drive means (22), the carrier (2) is arranged above the separator (12), the drive means (22) is arranged at least partly below the separator (12), the carrier (2) and the drive means (22) are coupled with the aid of at least one of magnetic and electromagnetic means in such a way that the carrier (2) can be moved by the drive means (22) using magnetic or electromagnetic force, wherein the drive means (22) has at least one of a mechanical and electrical guide unit (38) for moving the magnet (26) in the X/Y direction substantially in a plane below the separator (12), and wherein the drive means (22) has at least two independently drivable motors (40, 42) for operating the guide unit (38), and wherein the controller (20) is configured to control the drive means (22) and the dispensing device (18) in such a way that food mass can be produced in portions of different arrangements or patterns on the carrier (2).

2. The apparatus (1) according to claim 1, wherein the mechanical separator (12) is designed as a plate (14) having a substantially planar upper surface and that the carrier (2) rests on the plate (14) and can be moved therealong by the drive means (22).

3. The apparatus (1) according to claim 2, wherein the plate (14) is made of a non-magnetic material and is mounted directly or indirectly on the machine frame (4).

4. The apparatus (1) according to claim 1, wherein the drive means (22) has a magnet holder (24) and at least one permanent magnet (26) or electromagnet arranged below the separator (12) and on the magnet holder (24) of the drive means (22).

5. The apparatus (1) according to claim 1, wherein the guide unit (38) has two linear guide means (34, 36) and two drives for moving the magnet holder (24) in the X/Y direction.

6. The apparatus (1) according to claim 5, wherein the linear guide means (34, 36) are arranged with their longitudinal axes substantially perpendicular to each other.

7. The apparatus (1) according to claim 1, wherein the carrier (2) has a magnet holder (44) that has a recess (46) inside which the at least one magnet (48) is arranged directly above an upper side of the separator (12).

8. The apparatus (1) according to claim 1, wherein the carrier (2) arranged above the separator (12) has at least one permanent magnet (48).

9. The apparatus (1) according to claim 8, wherein the at least one magnet (48) arranged on the carrier (2) is arranged inside a recess (46) on the underside of the carrier (2) and is arranged directly above the separator (12) in order to cooperate in operation with, and be coupled by magnetic force to at least one magnet (26) of the drive means (22).

10. A method for portioning food mass on a carrier (2), using the apparatus (1) according to claim 1, wherein a carrier (2) for receiving food mass and arranged movably relative to a machine frame (4) is provided; and a dispensing device (18) for dispensing food mass is provided, which is arranged on or relative to the machine frame (4) in such a way that dispensed food mass lands on the movable carrier (2), the carrier (2) is moved relative to the frame (4) with the aid of a drive means (22), while preferably portioned food mass is dispensed onto the carrier (2) and deposited there with the aid of a dispensing device (18), wherein the carrier (2) is moved in operation above a mechanical separator (12) for mechanically separating the carrier (2) and the drive means (22) with the aid of a drive means (22) arranged below the separator (12), wherein the carrier (2) and the drive means (22) are coupled to each other with the aid of at least one of magnetic and electromagnetic means in such a way that the carrier (2) can be moved by the drive means (22) using magnetic or electromagnetic force, wherein the drive means (22) has at least one of a mechanical and electrical guide unit (38) for moving the magnet (26) in the X/Y direction substantially in a plane below the separator (12), and wherein the drive means (22) has at least two independently drivable motors (40, 42) for operating the guide unit (38), and wherein a controller (20) is provided, which is configured to control the drive means (22) for moving the carrier (2) and the dispensing device (18) for dispensing food mass in such a way that food mass can be produced in portions of different arrangements or patterns on the carrier (2).

11. The method according to claim 10, wherein the coupling is released when a particular force is exceeded.

12. An apparatus (1) for portioning food mass on a carrier (2), comprising:

a machine frame (4), a carrier (2) movably arranged on the frame (4), for receiving dispensed food mass, and a drive means (22) for moving the carrier (2), wherein:

a mechanical separator (12) is provided for mechanically separating the carrier (2) and the drive means (22), the carrier (2) is arranged above the separator (12), the drive means (22) is arranged at least partly below the separator (12), the carrier (2) and the drive means (22) are coupled with the aid of at least one of magnetic and electromagnetic means in such a way that the carrier (2) can be moved by the drive means (22) using magnetic or electromagnetic force, and wherein the drive means (22) has at least one of a mechanical and electrical guide unit (38) for moving the magnet (26) in the X/Y direction substantially in a plane below the separator (12), and wherein the drive means (22) has at least two independently drivable motors (40, 42) for operating the guide unit (38), and wherein the guide unit (38) is designed as a delta mechanism (50) with two drives.

13. The apparatus (1) according to claim 12, wherein the delta mechanism (50) has two articulated arms (52, 54), wherein each articulated arm (52, 54) has a first rotatably mounted arm (56) that can be pivoted by a motor (40, 42), and a second arm (57) rotatably mounted on the first arm (56), wherein the second arm (57) is rotatably articulated on the magnet holder (24).

* * * * *